(12) United States Patent
Usi

(10) Patent No.: US 10,276,063 B1
(45) Date of Patent: Apr. 30, 2019

(54) MULTIPLICATION TEACHING AID

(71) Applicant: Engracio Usi, Jersey City, NJ (US)

(72) Inventor: Engracio Usi, Jersey City, NJ (US)

( * ) Notice: Subject to any disclaimer, the term of this patent is extended or adjusted under 35 U.S.C. 154(b) by 679 days.

(21) Appl. No.: 14/942,062

(22) Filed: Nov. 16, 2015

(51) Int. Cl.
   *G09B 19/02* (2006.01)
   *G06C 1/00* (2006.01)

(52) U.S. Cl.
   CPC ........... *G09B 19/02* (2013.01); *G06C 1/00* (2013.01)

(58) Field of Classification Search
   CPC ........... G09B 3/02; G09B 19/02; G06C 1/00
   USPC ........................................... 434/198
   See application file for complete search history.

(56) References Cited

U.S. PATENT DOCUMENTS

| | | | |
|---|---|---|---|
| 6,358,059 B1 * | 3/2002 | Li | E02D 31/00 434/167 |
| 6,619,661 B1 * | 9/2003 | Collins | A63F 9/10 273/157 R |
| 8,500,016 B2 * | 8/2013 | Finamore | G06G 1/08 235/404 |

* cited by examiner

*Primary Examiner* — James B Hull
(74) *Attorney, Agent, or Firm* — Michael J. Feigin, Esq.; Feigin and Fridman LLC

(57) ABSTRACT

A multiplication wheel is disclosed herein. One selects a number on a first wheel, selects a number on a second wheel and aligns a tab of yet a third wheel to that of the first wheel. The third and top wheel has a plurality of portals which are covered by numbers. One selects the cover with one of the numbers in the multiplication problem, leading to the product of the two selected and aligned numbers from the first and second wheel (one of which is redundantly uncovered on the top wheel) and thus finds the product situated beneath, showing through from the second wheel.

8 Claims, 5 Drawing Sheets

MULTIPLICATION TEACHING AID

FIELD OF THE DISCLOSED TECHNOLOGY

The disclosed technology relates generally to math instruction, and, more specifically, to a device with rotating wheels for teaching multiplication.

BACKGROUND OF THE DISCLOSED TECHNOLOGY

In order to succeed, the ability to add, subtract, multiply and divide is an essential component of a child's education in almost every society. The ability to carry out such calculations is a critical indicator of a child's early success in school, which often determines his or her placement in a higher or lower level math class. Multiplication, in particular, is usually taught for more than half of a school year and is a necessary building block for almost all branches of math education. Tools do exist to teach children math, including number lines, charts, and flash cards. However, there is a never-ending search for enjoyable ways to teach children math, so that they will excel and advance in their studies and, ultimately, life endeavors.

SUMMARY OF THE DISCLOSED TECHNOLOGY

A multiplication device is used in embodiments of the disclosed technology. This device, in embodiments, is circular and has a back wheel with numbers arranged sequentially around this wheel and a middle wheel having a smaller circular circumference than the back wheel, while being centered on, and attached to, the back wheel. The middle wheel also has numbers arranged sequentially around it. A front wheel having a smaller circular circumference than the middle wheel and back wheel is centered on, and attached to, the middle wheel (and back wheel). A number of openings with covers on the front wheel each cover a respective opening which passes through the front wheel and opens into the middle wheel. The cover can be attached on one side and be rectangular in nature, with the other sides disconnected or cut out from the top wheel.

A plurality of (two or more, such as twelve) groups of numbers are on the middle wheel. Each group of numbers has a plurality of numbers in the grouping (such as products of twelve multiplication problems in each of the twelve groupings for a total of 144 numbers). Each such group of numbers can be arranged in an identical pattern as the plurality of openings with covers.

The numbers arranged sequentially around the back wheel and the middle wheel are visible and uncovered by the front, middle, or back wheels in embodiments, even when the wheels are rotatably attached to one another. Each number in each group of numbers can also be positioned such that it is a product of a number on the cover and one other number when aligned under the number on the cover.

Each cover can cover a number printed there-on which is a factor in a multiplication equation that is solved using the device based on the factor. Each of the plurality of groups of numbers on the middle wheel can be spaced in a manner which corresponds to an arrangement of the openings of the top wheel. Each of the plurality of groups of numbers on the middle wheel can be-spaced equally from a midpoint of the circular middle wheel (see the midpoint drawn in the center of FIG. 4). That is, the radial spacing from a center of the circle for each group of numbers, and each same positioned number within each group can be identical.

Each of the plurality of groups of numbers in each said grouping is, in embodiments, a product of a whole number and one of the numbers printed on the cover, which is then opened to reveal the product, the number on the cover being at an equal distance from a midpoint of the top wheel and the middle wheel as the product it covers. The top wheel has a portal spaced equally from the midpoint of the top and the middle wheel as each number of the back wheel. The afore-described portal is, in embodiments of the disclosed technology, on a tab forming a unitary structure with the top wheel, and covering at least a part of the middle wheel.

The numbers of/on the back wheel and the numbers of/on the middle wheel are radially spaced apart an equal amount from a next sequential number of the respective numbers printed at or near the edge of each wheel. One number of the numbers of the back wheel, which is situated under the portal of the front wheel, is a first factor in a multiplication problem, Another number on the outer rim (near the edge) of the second middle wheel is a second factor in the multiplication problem. On the covers, one of these numbers is also one of the selected numbers on the middle and/or back wheel and is, therefore, also a factor in the multiplication problem. A number on the middle wheel aligned with the number, which is a factor on the covers, is a product in the multiplication problem.

The top wheel, middle wheel, and bottom wheel are fastened to one another at a central point, such that each wheel is rotatable around one other, and the tab of the top wheel and a tab of a middle wheel extend past an outer edge of a front side of the bottom wheel, in embodiments of the disclosed technology.

Expressed in another manner, a multiplication device of the disclosed technology has a) a back wheel with sequential numbers forming a first factor in a multiplication problem, b) a middle wheel with sequential numbers forming a second factor in the multiplication problem, and c) an upper wheel with a plurality of covers and/or openings, each cover of the plurality of covers having a number there-on, as well as a maximum of two covers situated directly above a number on the middle wheel which is a product of the first factor and the second factor.

There are, in embodiments of the disclosed technology, a maximum of two covers which are a product of the first factor and the second factor (e.g., 4×5=20 and 5×4=20, so the cover labeled '5' or '4' would both produce a correct answer of 20 situated beneath the cover). A number of the sequential numbers (such as numbers 1-12) of at least the back wheel and/or the middle wheel is equal to a number of the plurality of covers on openings (again, such as 1-12).

The back wheel, middle wheel, and upper wheel are circular and attached at a mid-point of each respective circular wheel, in embodiments fo the disclosed technology. The front and middle wheels form a unitary structure with, or are attached to, a tab extending outwards from an edge of each respective circular wheel, in embodiments of the disclosed technology. The tab of the front wheel can have a portal, such that one number at a time of the sequential numbers of the back wheel is visible through the portal.

DETAILED DESCRIPTION OF EMBODIMENTS OF THE DISCLOSED TECHNOLOGY

The disclosed technology described herein provides a device and method of use for carrying out a multiplication problem in a fun manner. One selects a number on a first wheel, selects a number on a second wheel and aligns a tab of yet a third wheel to that of the first wheel. The third wheel (i.e., the top wheel) has a plurality of portals which are covered by numbers. After selecting the cover with one of the numbers in the multiplication problem, one will find the product of the two selected and aligned numbers from the first and second wheel (one of which is redundantly uncovered on the top wheel) and finds the product situated beneath, showing through from the second wheel.

Embodiments of the disclosed technology will become clearer in view of the forthcoming description of the figures.

Figure 1:
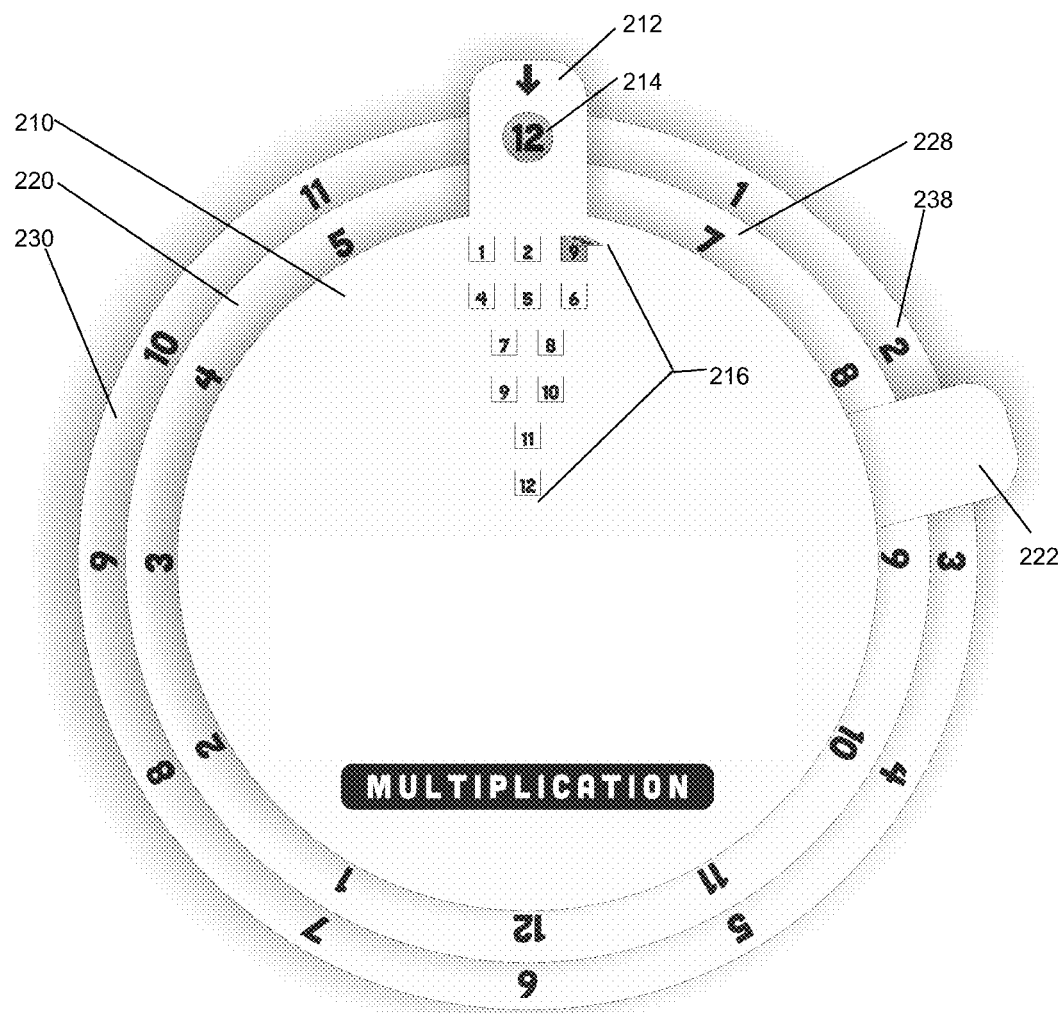
FIG. 1 shows the number wheels used in an embodiment of the disclosed technology.

FIG. 1 shows number wheels used in an embodiment of the disclosed technology. Looking first at FIG. 1, there are at least three circular wheels which are placed on top of one another and rotatable with respect to one another: top wheel 210, middle wheel 220, and bottom wheel 230. While additional wheels can be used, the naming of "top," "middle," and "bottom" will be used for convenience and ease of understanding the detailed description. The wheels are attached or rotatably fixed to one another at a central point of the circular sides.

Figure 5:
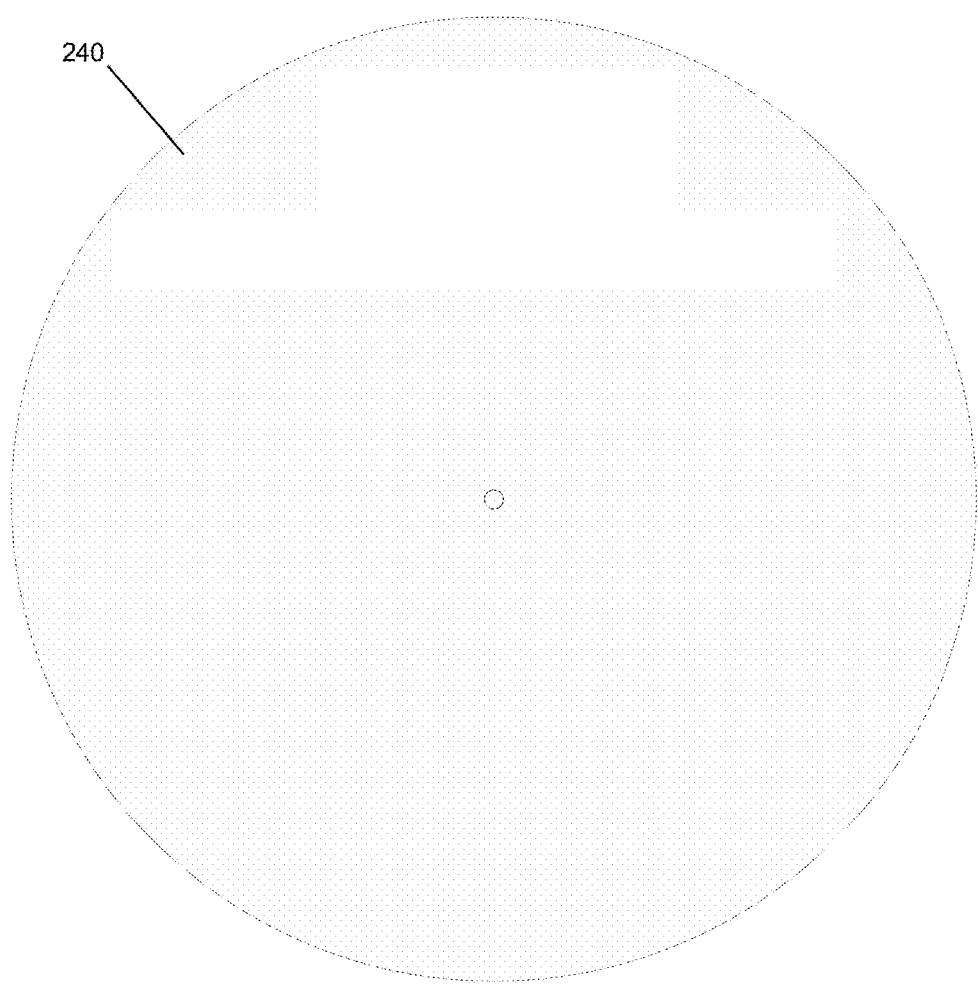
FIG. 5 shows a fourth wheel of the number wheels shown in FIG. 1.

Now discussing the wheels from bottom to top, FIG. 5 shows a fourth wheel of the number wheels shown in FIG. 1. This wheel is not visible in FIG. 1 and, when desired to be used, this base wheel 240 is of harder, more rigid, and/or wider material than the other wheels, so as to provide a support for the other wheels. It is of equal circular circumference and diameter as the bottom wheel 230 or greater than it.

Figure 4:
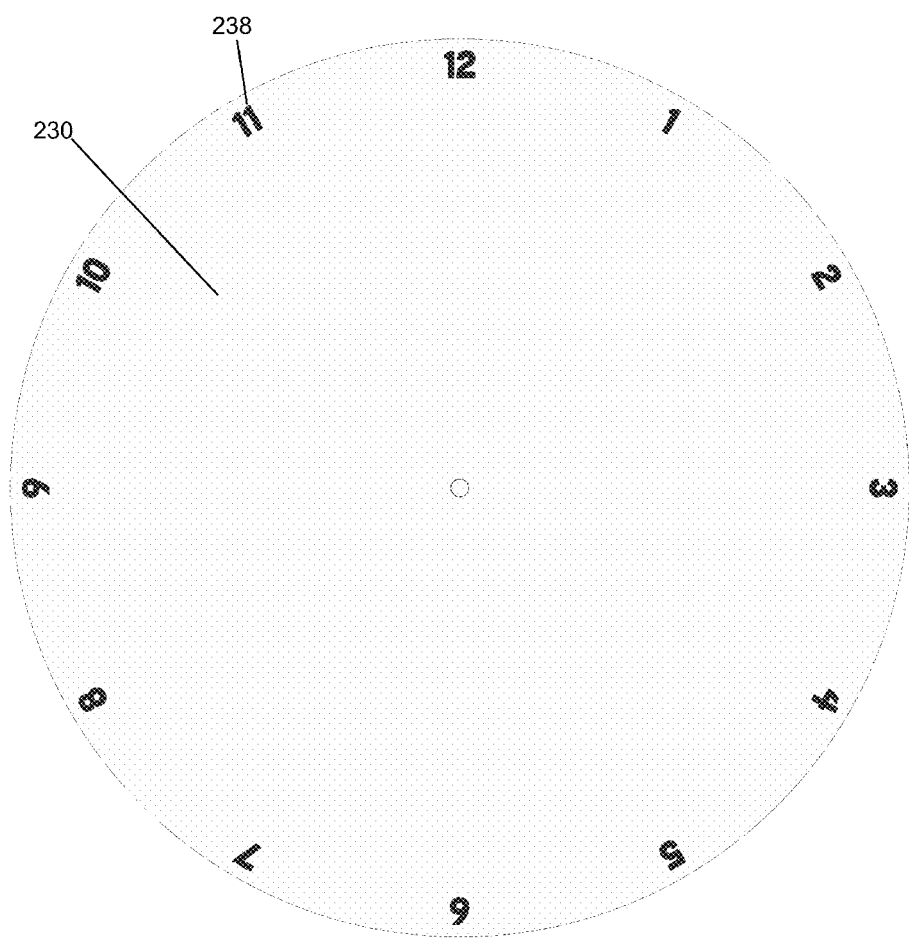
FIG. 4 shows a third wheel of the number wheels shown in FIG. 1.

FIG. 4 shows a third wheel of the number wheels shown in FIG. 1. On this back wheel 230 are clock numbers 238, including numbers 1 through 12 arranged clockwise, with each number offset around the circle an equal amount (360/12=30 degrees between each two numbers). On this back wheel 230 a cut out center point can be used to pass through a connector. This is likewise on some or all of the wheels, such that they are connected by way of a fastener passing through multiple center points of the wheels in order to connect them.

Figure 3:
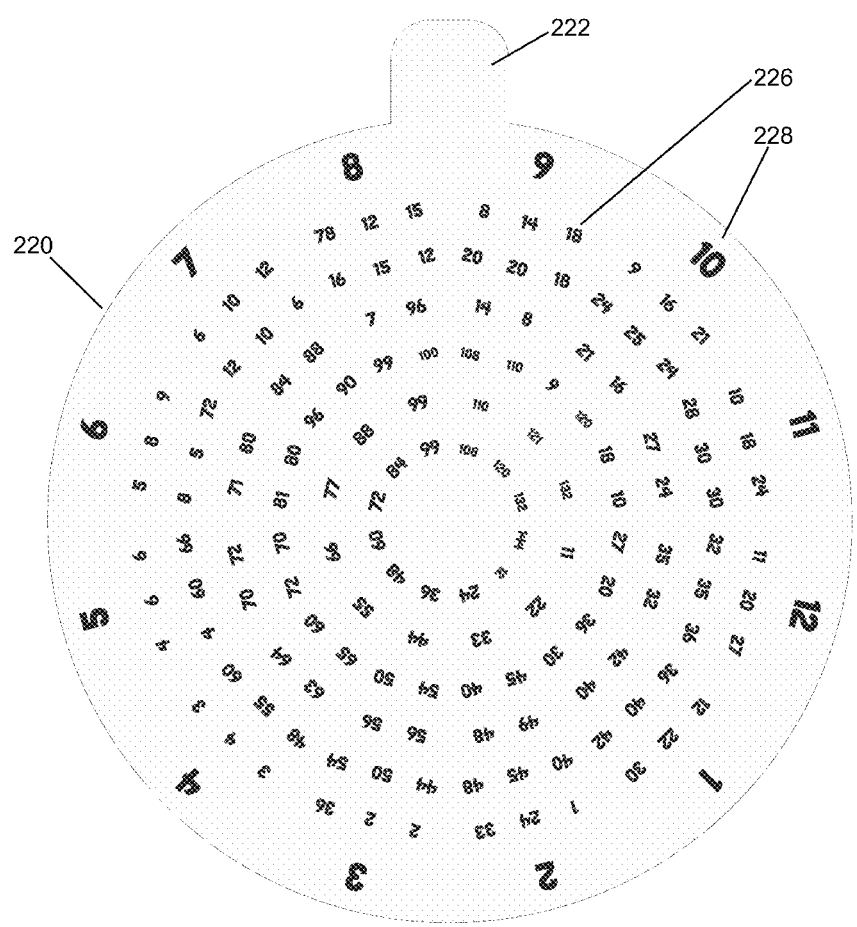
FIG. 3 shows a second wheel of the number wheels shown in FIG. 1.

FIG. 3 shows a second wheel of the number wheels shown in FIG. 1. This wheel 220, like wheel 230, has a sequence of clock numbers 228 around the outside offset at 30 degrees from one another. In addition, a plurality of answers 226 to multiplication problems is shown.

Figure 2:
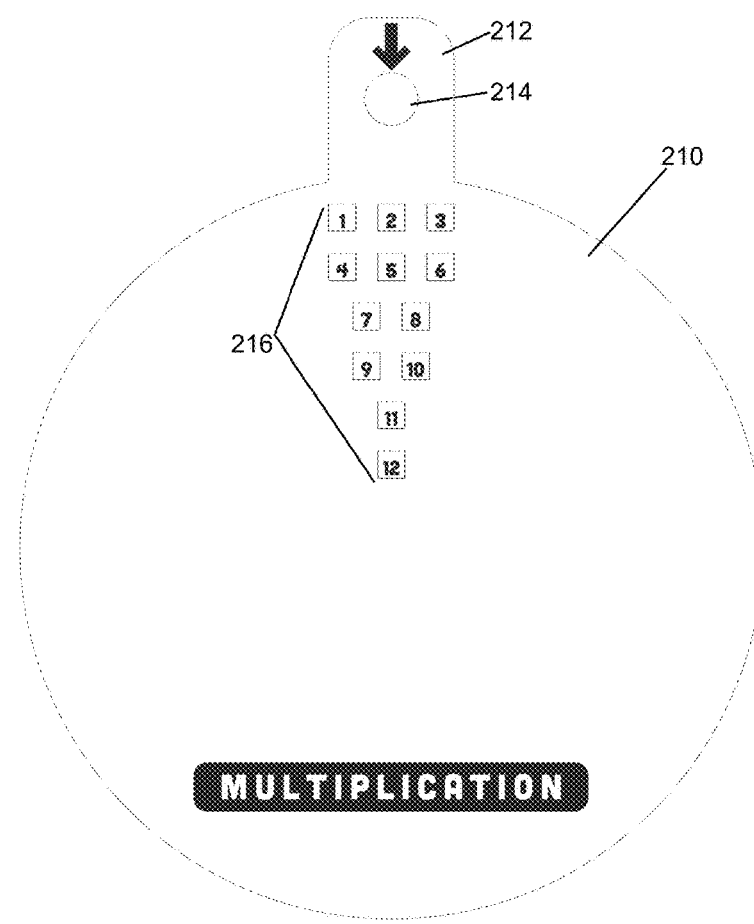
FIG. 2 shows the top wheel of the number wheels shown in FIG. 1.

Before further discussion, it is now necessary to look at FIG. 2. FIG. 2 shows the top wheel of the number wheels shown in FIG. 1. Here, the wheel 210 has 12 openings 216 labeled 1 through 12 in precise spaces relative to the portal 214 on the tab 212. The portal 214 is alignable over a clock number 238 on back wheel 230. Once this is done, one rotates the middle wheel by tab 222 in order to present a multiplication problem.

Looking under the numeral "9," for example on wheel 220, we see 12 numbers corresponding in position to spaces under the 12 numbers shown on wheel 210. These numbers, in order, are 8, 14, 18, 20, 20, 18, 14, 8, 108, 110, 110, and 108. The astute mathematician will notice a pattern here, keeping in mind the numbers above are, in order, 1, 2, 3, 4, 5, 6, 7, 8, 9, 10, 11, 12. Thus, the answers 226 under the 9 are actually multiples of the top number 216 from the top wheel 210. That is, they are the products, in order, of 1*8, 2*7, 3*6, 4*5, 5*4, 6*3, 7*2, 8*1, 9*12, 10*11, 11*10, and 12*9. In other words, one gets an entire table of multiplication problems by aligning the dials.

Thus, the resulting answer 226 is aligned beneath a number having an opening 216 and becomes aligned as such by aligning the tab 212 of the top dial with the number desired, and then selecting that number on an opening 216 to find the product. Thus, one can get 5*4=20 or 4*5=20.

Referring again to FIGS. 2 and 3, FIG. 2 shows the position of the openable flaps 216 with numbers 1 through 12. Those numbers 1 through 12 are one of the factors in a multiplication problem, while the number showing through portal 214 is the other factor. The product is beneath the selected portal. The multiplicative identity is 1, so each number in the groupings of numbers 226 around the wheel 220 has an identity number under the "1" flap. However, because of the way the discs rotate around one another, each disc is one off in the rotation (30 degrees to get to the next number). So under the "2" flap one is multiplying one less than the number multiplied under the "1" flap. For example, under the 1 flap one might find a "6" when 6 and 1 are aligned, then next to the six is a "10" because this is 5 and 2 as factors in the equation. Then the numbers, in the 1-12 slot order in the groupings 226, head downwards after reaching a maximum. Thus, to achieve a correct mathematical problem, one must pick the correct factor chosen from the outer number of dial 238 as one of the factors 216 (the outer number and factor are identical), in order to get the right product of the other outer number 228 that it is aligned with. This alignment of a number 228 and 238 along with a selection of one of those numbers yields the correct product situated in one of the groupings 226 up to the selected number/factor 216.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A circular mathematical calculation device, comprising:

a back wheel with a first set of numbers arranged sequentially around the back wheel forming a first factor in a multiplication problem;

a middle wheel having a smaller circular circumference than said back wheel, centered on and rotatably attached to said back wheel, said middle wheel having a second set of numbers arranged sequentially around the middle wheel forming a second factor in said multiplication problem, wherein said first set and said second set are a same or a different set of numbers:

a front wheel having a smaller circular circumference than said middle wheel, centered on and rotatably attached to said middle wheel;

a plurality of openings, each opening having a cover, on said front wheel, each cover having a number arranged thereon, wherein one of these numbers is the first or second factor in said multiplication number, each opening through said front wheel configured to make visible the surface of said middle wheel when the cover is opened;

a plurality of groups of numbers on said middle wheel positioned closer to the center of the middle wheel than the second set of numbers, each of said group of numbers arranged in an identical pattern as said plurality of openings with covers, each number of each of said group of numbers viewable through at least one of said openings;

wherein said first set of numbers arranged sequentially around said back wheel and said second set of numbers arranged sequentially around said middle wheel are visible and uncovered by any of said middle or back wheel; and wherein each number in each group of numbers in said plurality of groups of numbers is positionable such that it is a product of a number arranged on one of said covers and one other number from the first or second set of numbers on the back or middle wheels when aligned under said number on said one of said covers;

wherein each number from the first set of numbers is alignable with each number from the second set of numbers and the openings with covers in order to form the multiplication problem.

2. The device of claim 1, wherein each group of said plurality of groups of numbers on said middle wheel is spaced an equal distance from the center of said middle wheel.

3. The device of claim 2, wherein each number in each of said plurality of groups of numbers is a product of a whole number and one of said numbers printed on said cover at an equal distance from a midpoint of both said front wheel and said middle wheel.

4. The device of claim 3, wherein said front wheel comprises a portal spaced an equal distance from said center of said front and said middle wheel as each number of said back wheel, the portal comprising an opening through which numbers from the first set of numbers are configured to be visible.

5. The device of claim 4, wherein said portal is on a tab forming a unitary structure with said front wheel and covering at least a part of said middle wheel.

6. The device of claim 4, wherein said numbers of said back wheel and said numbers of said middle wheel are radially spaced apart an equal amount from a next sequential number of the first set of numbers and said second set of numbers.

7. The device of claim 4, wherein said front wheel, middle wheel, and back wheel are fastened to one another at a central point, such that each wheel is rotatable around one other, and a tab of said front wheel and a tab of said middle wheel extend past an outer edge of a front side of said bottom wheel.

8. The multiplication device of claim 4, wherein only one number of said sequential numbers of said back wheel is visible through said portal at a time.

\* \* \* \* \*